(12) United States Patent
Ljung

(10) Patent No.: US 11,985,546 B2
(45) Date of Patent: May 14, 2024

(54) NETWORK NODE, A WIRELESS COMMUNICATIONS DEVICE AND METHODS THEREIN FOR ACCESSING AN UNLICENSED RADIO FREQUENCY BAND

(71) Applicant: SONY CORPORATION, Tokyo (JP)

(72) Inventor: Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/768,369

(22) PCT Filed: Jan. 14, 2019

(86) PCT No.: PCT/SE2019/050019
§ 371 (c)(1),
(2) Date: May 29, 2020

(87) PCT Pub. No.: WO2019/139536
PCT Pub. Date: Jul. 18, 2019

(65) Prior Publication Data
US 2020/0374757 A1 Nov. 26, 2020

(30) Foreign Application Priority Data
Jan. 15, 2018 (SE) .................... 1850039-7

(51) Int. Cl.
*H04W 72/56* (2023.01)
*H04W 28/20* (2009.01)
(Continued)

(52) U.S. Cl.
CPC ........... *H04W 28/20* (2013.01); *H04W 48/16* (2013.01); *H04W 72/56* (2023.01); *H04W 88/06* (2013.01)

(58) Field of Classification Search
None
See application file for complete search history.

(56) References Cited

U.S. PATENT DOCUMENTS 9,380,594 B1 * 6/2016 Malmirchegini ..... H04W 24/08
9,706,538 B1 * 7/2017 Oroskar ............ H04W 72/0453
(Continued)

FOREIGN PATENT DOCUMENTS

CN 103168491 A 6/2013
CN 104301273 A 1/2015
(Continued)

OTHER PUBLICATIONS

Swedish Search Report from corresponding Swedish Application No. 1850039-7, dated Sep. 21, 2018, 3 pages.
(Continued)

*Primary Examiner* — German Viana Di Prisco
(74) *Attorney, Agent, or Firm* — Tucker Ellis LLP

(57) ABSTRACT

A method performed by a wireless communications device for accessing an unlicensed radio frequency band. The wireless communications device is configured to operate in the unlicensed radio frequency band. The unlicensed radio frequency band comprises a plurality of radio frequency bandwidth parts and is used by a wireless communications network comprising a network node. The wireless communications device receives, from the network node, an indication enabling the wireless communications device to make a prioritization among the plurality of radio frequency bandwidth parts. The wireless communications device accesses the unlicensed radio frequency band in accordance with the prioritization.

19 Claims, 11 Drawing Sheets

(51) Int. Cl.
*H04W 48/16* (2009.01)
*H04W 88/06* (2009.01)

(56) References Cited

U.S. PATENT DOCUMENTS

| | | | | |
|---|---|---|---|---|
| 10,104,693 | B1* | 10/2018 | Zhang | H04W 72/06 |
| 2007/0115877 | A1 | 5/2007 | Zhen et al. | |
| 2012/0039284 | A1 | 2/2012 | Barbieri et al. | |
| 2013/0109372 | A1* | 5/2013 | Ekici | H04W 24/10 455/422.1 |
| 2013/0252553 | A1 | 9/2013 | Hyon | |
| 2015/0126207 | A1* | 5/2015 | Li | H04W 28/16 455/452.1 |
| 2015/0326612 | A1 | 11/2015 | Faccin et al. | |
| 2016/0212629 | A1* | 7/2016 | Wei | H04W 36/0085 |
| 2016/0286565 | A1 | 9/2016 | Kim et al. | |
| 2017/0055268 | A1 | 2/2017 | Aksu | |
| 2017/0195901 | A1* | 7/2017 | Zhou | H04W 24/02 |
| 2017/0201998 | A1 | 7/2017 | Akiyama et al. | |
| 2018/0049219 | A1* | 2/2018 | Gupta | H04L 5/0041 |
| 2020/0274678 | A1* | 8/2020 | Lin | H04W 72/0413 |
| 2020/0404661 | A1* | 12/2020 | Chen | H04W 72/0453 |
| 2021/0127324 | A1* | 4/2021 | Agiwal | H04W 74/002 |

FOREIGN PATENT DOCUMENTS

| | | |
|---|---|---|
| CN | 104662939 A | 5/2015 |
| CN | 106028458 A | 10/2016 |
| CN | 106233813 A | 12/2016 |
| CN | 106413096 A | 2/2017 |
| CN | 107211403 A | 9/2017 |
| WO | 2016115678 A1 | 7/2016 |

OTHER PUBLICATIONS

International Search Report and Written Opinion from corresponding International Application No. PCT/SE2019/050019, dated Mar. 18, 2019, 10 pages.

Sony, High Level Views on NR-U BWP[online],3GPP TSG RAN WG1 #91 R1-1720475,Internet<URL:http://www.3gpp.org/ftp/tsg_ran/WG1/TSGR1_91/Docs/R1-1720475.zip>,Nov. 18, 2017.

* cited by examiner

NETWORK NODE, A WIRELESS COMMUNICATIONS DEVICE AND METHODS THEREIN FOR ACCESSING AN UNLICENSED RADIO FREQUENCY BAND

TECHNICAL FIELD

Embodiments herein relate to a network node, a wireless communications device, and methods therein. In particular they relate to accessing an unlicensed radio frequency band in a wireless communications network.

BACKGROUND

Wireless communications devices such as terminals are also known as e.g. User Equipments (UE), mobile terminals, wireless terminals and/or mobile stations. These terms will be used interchangeably hereafter. Wireless communications devices are enabled to communicate wirelessly in a wireless communications network, such as a radio communications network or cellular communications network. The wireless communications network may also be referred to as a wireless communication system, sometimes also referred to as a cellular radio system or a cellular system. The communication may be performed e.g. between two wireless communications devices, between a wireless communications device and a regular telephone and/or between a wireless communications device and a server via a Radio Access Network (RAN) and possibly one or more core networks, comprised within the cellular communications network.

The radio signals in the wireless communications network are sent from a radio transmitter to a radio receiver where the transmitter and receiver are spatially separated, typically with a number of meters up to a couple of kilometers. In radio communication the typical notation of this signal transfer of a distance in the air is that the signal is propagating through a radio channel, or simply channel.

Examples of wireless communications networks are Long Term Evolution (LTE), Universal Mobile Telecommunications System (UMTS) and Global System for Mobile communications (GSM).

Wireless communications devices may further be referred to as mobile telephones, cellular telephones, laptops, or surf tablets with wireless capability, just to mention some further examples. The wireless communications devices in the present context may be, for example, portable, pocket-storable, hand-held, computer-comprised, or vehicle-mounted mobile devices, enabled to communicate voice and/or data, via the RAN, with another entity, such as another wireless communications devices or a server.

In a forum known as the Third Generation Partnership Project (3GPP), telecommunications suppliers propose and agree upon standards for networks and investigate enhanced data rate and radio capacity.

A radio transmission in e.g. 3GPP systems has a center frequency, also denoted as carrier frequency, around which the radio transmission bandwidth is centered around. A radio transmission of a modulated signal in a radio system can be denoted as a carrier. In order to use a larger aggregated bandwidth than the utilized bandwidth of one carrier, a concept denoted carrier aggregation can be used, where multiple individual radio links are used (transmitted and/or received) within the same system.

In 3GPP fifth generation (5G) RAN, also referred to as 5G New Radio (NR), cellular communications systems will be able to use not only their licensed radio spectrum, but also unlicensed radio spectrum. Licensed spectrum includes frequencies that may be reserved for a specific use. These are the ones licensed by a government to cellular companies, as one example. Unlicensed spectrum, also called license-free or license excempt spectrum, may be publicly owned, and there is no requirement to achieve a license to use them.

Some of the proposed radio frequency bands for use as unlicensed bands in 5G NR are very wide. One example is the 60 GHz unlicensed band (57-64 GHz) which is in the order of 7 GHz wide. When communicating using wireless communication a certain bandwidth within the radio spectrum is being utilized by the radio signals. Hence a radio bandwidth is a part of a radio spectrum.

The NR system is flexible in its physical layer characteristics, and e.g. an Orthogonal Frequency-Division Multiplexing (OFDM) numerology may be adjusted by an operator to suit different system bandwidths. E.g. when a large system bandwidth is used it may be beneficial to use a larger sub-carrier spacing, since that will limit the total amount of required OFDM subcarriers to fill the system bandwidth. However, in an other narrow band deployment, the operator may benefit from selecting a smaller sub-carrier spacing for the NR technology in order to use a certain minimum amount of sub-carriers for the system. A total system bandwidth as well as a UE specific bandwidth may therefore be adjusted relatively flexibly. However, there are still certain constraints e.g. in terms of radio front end implementation complexity to consider where the system may even with a large subcarrier spacing be limited to bandwidths in the order of 1 GHz, and a maximum UE bandwidth may be smaller than that.

When such wide system bandwidths, like 1 GHz, of an unlicensed band is used for a single radio link in a NR wireless communications system, together with channel sensing methods typically needed for unlicensed bands, such as Listen Before Talk (LBT), there are problems associated with using listen before talk algorithms of the prior art for controlling whether a wireless communications device is allowed to transmit. For example, using a system frequency specific listen before talk algorithm for controlling whether a wireless communications device is allowed to transmit would mean that a transmitting wireless communications device must ensure that hundreds of MHz are free at the same time before transmitting anything. Also sensing the full system bandwidth doesn't give very good information on where in the system bandwidth there is potential interfering energy, even if the LBT succeeds. Hence there exists a need within wireless communications to develop the usage of the unlicensed radio spectrum further.

SUMMARY

An object of embodiments herein is to improve the performance of a wireless communications network by improving the usage of unlicensed radio spectrum.

According to a first aspect of embodiments herein it is provided a method performed by a wireless communications device for accessing an unlicensed radio frequency band.

The wireless communications device is configured to operate in the unlicensed radio frequency band. The unlicensed radio frequency band comprises a plurality of radio frequency bandwidth parts and is used by a wireless communications network comprising a network node.

The wireless communications device receives, from the network node, an indication enabling the wireless communications device to make a prioritization among the plurality of radio frequency bandwidth parts.

The wireless communications device accesses the unlicensed radio frequency band in accordance with the prioritization.

According to a second aspect of embodiments herein it is provided a method performed by a network node for controlling access to the unlicensed radio frequency band. The unlicensed radio frequency band comprises a plurality of bandwidth parts and is used by a wireless communications network comprising the network node.

The network node transmits to a wireless communications device configured to operate in the wireless communications network, an indication enabling the wireless communications device to make a prioritization among the plurality of bandwidth parts comprised in the unlicensed radio frequency band.

According to a third aspect of embodiments herein it is provided a wireless communications device configured to operate in an unlicensed radio frequency band used by a wireless communications network, and further configured to access the unlicensed radio frequency band by being configured to receive from a network node comprised in the wireless communications network, an indication enabling the wireless communications device to make a prioritization among a plurality of bandwidth parts comprised in the unlicensed radio frequency band, and access the unlicensed radio frequency band in accordance with the prioritization.

According to a fourth aspect of embodiments herein it is provided a network node configured to operate in an unlicensed radio frequency band used by a wireless communications network.

The network node is configured to control access to the unlicensed radio frequency band by being configured to transmit, to a wireless communications device configured to operate in the wireless communications network, an indication enabling the wireless communications device to make a prioritization among a plurality of bandwidth parts comprised in the unlicensed radio frequency band.

According to a further aspect of embodiments herein it is provided a computer program, comprising instructions that, when executed on at least one processor, causes the at least one processor to carry out the method according to the first or third aspect above.

According to a further aspect of embodiments herein it is provided a carrier containing the computer program of the previous aspect, wherein the carrier is one of an electronic signal, optical signal, radio signal, or computer readable storage medium.

Since the wireless communications device receives, from the network node, an indication enabling the wireless communications device to make a prioritization among the plurality of bandwidth parts the wireless communications device is able to access the unlicensed radio frequency band in accordance with its own prioritization, without receiving prioritisations from the network. Therefore, the wireless communications device is able to optimize the accessing of the unlicensed radio frequency band, e.g. optimize the selection of one of the plurality of bandwidth parts with respect to e.g. listen before talk success rate, while reducing the overhead signaling in the wireless communications network.

An advantage of embodiments herein is that they save radio access resources since less radio access resources are needed to provide the indication enabling the wireless communications device to make the prioritization among the plurality of bandwidth parts compared to providing information about prioritized bandwidth parts from the wireless communications network. For example, the frequency as well as the actual content of control messages from the wireless communications network may be reduced.

BRIEF DESCRIPTION OF THE DRAWINGS

Examples of embodiments herein are described in more detail with reference to attached drawings in which.

DETAILED DESCRIPTION

Figure 1A:
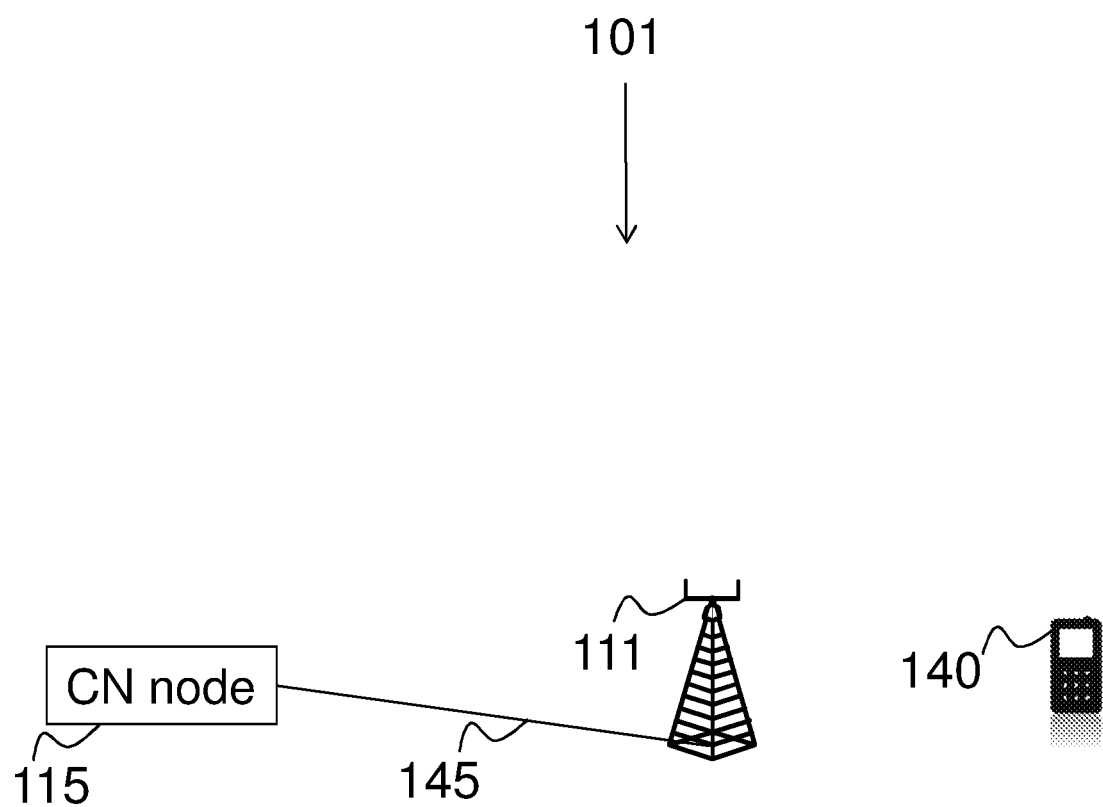
FIG. 1A is a schematic block diagram illustrating a wireless communications network.

As mentioned above, when a wide bandwidth of an unlicensed radio frequency band is used for a single radio link in a wireless communications system, together with channel sensing methods typically needed for unlicensed bands, such as LBT, there are problems associated with using LBT algorithms of the prior art for controlling whether a wireless communications device is allowed to transmit.

Embodiments herein describe solutions to the above mentioned problems by enabling a wireless communications device to prioritize among a plurality of radio frequency bands comprised in the unlicensed radio frequency band, i.e. an unlicensed system bandwidth. In the context of this application, enabling may include or mean allowing.

The network, e.g. the gNB, may define the plurality of radio frequency bands within the unlicensed system bandwidth. In other words, the network has, e.g. the gNB or the gNB via control signaling together with one or more UEs, determined a suitable system bandwidth which is used for wireless communication by the network. This system bandwidth is therefore a subset of an available, typically defined by regulators, unlicensed frequency band that could be used for communication. A selection of the system bandwidth, e.g. the subset of the unlicensed frequency band has been conducted by e.g. selecting a center frequency and a system bandwidth to be used. In practice, this could as one example mean that the system has an unlicensed frequency band available which could be several hundreds of MHz wide and determined by regulators defining the frequency bands available for unlicensed radio communication, and the system decides e.g. on a semistatic manner a suitable frequency band to be used for its system bandwidth, which could be e.g. 100 MHz wide. Some of the proposed radio frequency bands for use as unlicensed bands in 5G NR are very wide. One example is the 60 GHz unlicensed band (57-64 GHz)

which is in the order of 7 GHz wide. The system bandwidth is a frequency range which at least one node in the wireless system has a capability to transmit on and thereby occupy at the same time with one radio signal transmission.

Secondly, within this determined system bandwidth utilized by the wireless network, the network has defined two or more bandwidth parts (BWPs), where each BWP is a subset bandwidth within the network utilized bandwidth. Hence, the BWP is a frequency range which is smaller or equal to the size of the system bandwidth, and in terms of absolute frequency the range of the BWP is entirely within the already defined system bandwidth. As one example, a BWP frequency range could be e.g. 20 MHz wide. The system may determine the suitable size and frequency location within its system bandwidth. While the system bandwidth is used for communication by the network, it is not required that the full range of the system bandwidth is used in each radio link, meaning e.g. for communication by the network with UE 140. E.g. a BWP, a smaller portion of the system bandwidth, within the system bandwidth can be used. But if the network communicates with UE 140 it will use at least some part of the system bandwidth.

A wireless communications device, such as a UE, that is supposed to transmit on a wide bandwidth unlicensed carrier may attempt to access one radio frequency part within the system bandwidth, such as a BandWidth Part (BWP), at the time, in a prioritized order. The wireless communication device may thus be configured to store an indication of the prioritized order of the BWP to be used for accessing the system BW. This may e.g. be used to access a radio channel with a smaller part of the system bandwidth, e.g. in case the amount of data to transmit is small. In other words, selecting a BWP for accessing the channel encompasses selecting between predefined parts of a predefined system bandwidth.

Embodiments herein may be implemented in one or more wireless communications networks and FIG. 1A depicts parts of such a wireless communications network 101. The wireless communications network 101 may for example be a 5G, LTE, UMTS, GSM, any 3GPP wireless communications network, or any cellular wireless communications network or system. NR will hereafter be used as the radio access technology to exemplify the embodiments, although the solution is thus not limited thereto.

The wireless communications network 101 comprises a plurality of base stations and/or other network nodes. More specifically, the wireless communications network 101 comprises a network node 111, 115.

The term "network node" may correspond to any type of radio network node or any network node which communicates with at least a radio network node. For example, the network node 111, 115 may be a base station 111, such as a gNB or eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communications device within a cell served by the base station depending e.g. on the radio access technology and terminology used.

The network node 111, 115 may also be an RNC in an UMTS system.

In some embodiments the network node 111, 115 is a core network 115.

The network node 111, 115 may communicate with a wireless communications device 140, also referred to as a UE. The core network node 115 may communicate with the wireless communications device 140 via the base station 111, e.g. by using an interface 150 between the core network node 115 and the base station 111.

The wireless communications device 140 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device to device UE, MTC UE or UE capable of machine to machine communication, iPAD, mobile terminals, smart phone, Laptop Embedded Equipment (LEE), Laptop Mounted Equipment (LME), USB dongles etc. or any other radio network units capable to communicate over a radio link in a wireless communications network.

Please note the term user equipment used in this disclosure also covers other wireless devices such as Machine to machine (M2M) devices, even though they are not operated by any user.

Figure 1B:
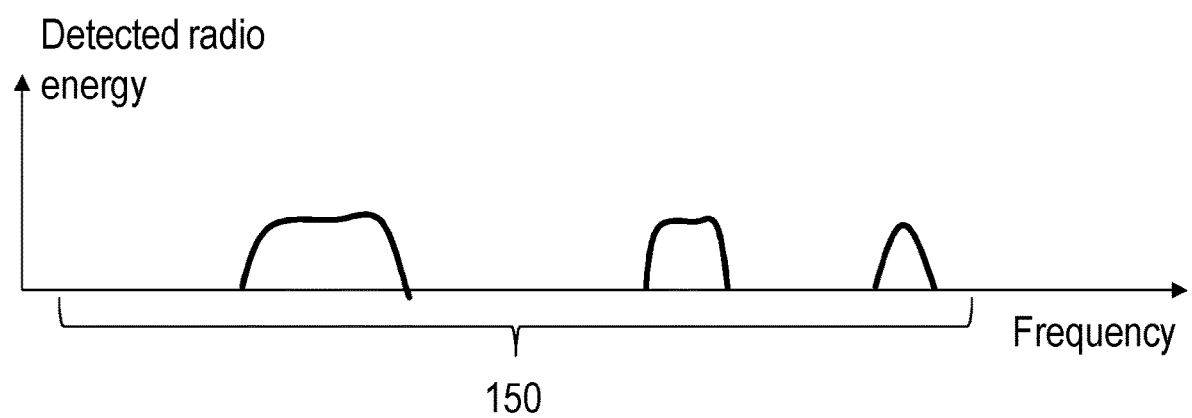
FIG. 1B is a schematic block diagram illustrating a radio spectrum.

Furthermore, the network node 111, 115 is configured to communicate over the air or radio interface operating on radio frequencies with the wireless communications device 140 within range of the network node 111, 115. In embodiments herein these radio frequencies belong to an unlicensed radio frequency band 150, used by the wireless communications network 101, and depicted in FIG. 1B. Thus the wireless communications device 140 and the network node 111, 115 are each configured to operate in the unlicensed radio frequency band 150 used by the wireless communications network 101. Operating in or within a system bandwidth comprises receiving and/or transmitting radio communication signals from/to one or more other nodes within the network, where the radio communication signals are frequency wise emitting energy within the frequency range defined by the system bandwidth. Nodes within the network could be radio base stations or mobile devices.

In embodiments herein the unlicensed radio frequency band 150 may comprise a plurality of radio frequency bandwidth parts BWP1-BWP6, also referred to as bandwidth parts or BWPs.

In some embodiments herein the unlicensed radio frequency band 150 is comprised in the 60 GHz unlicensed band (57-64 GHz) which is in the order of 7 GHz wide. The system bandwidth of the unlicensed radio system may be several hundreds of MHz, or even in the order of 1 GHz.

The wireless communications device 140 transmits data and control signals over the radio interface to the network node 111, 115 in UpLink (UL) transmissions, and the network node 111, 115 transmits data and control signals over an air or radio interface to the wireless communications device 140 in DownLink (DL) transmissions.

Control signalling as mentioned herein may be carried out on different levels, including Layer 1 signaling (downlink control information (DCI), PDCCH—physical downlink control channels), and Layer 3 radio resource control signalling. Also other control signalling is available in 3GPP standard documents, such as system information which could be broadcasted or dedicated transmitted.

Below, methods for controlling access to the unlicensed radio frequency band 150 used by the wireless communications network 101 will be illustrated in more detail by a number of exemplary embodiments. The following embodiments will be described using NR as an example and the network node 111, 115 will be an NR base station, i.e. a gNB, although these embodiments are not limited to the use of NR.

It should be noted that these embodiments are not mutually exclusive. Components from one embodiment may be tacitly assumed to be present in another embodiment and it will be obvious to a person skilled in the art how those components may be used in the other exemplary embodiments.

Figure 2:
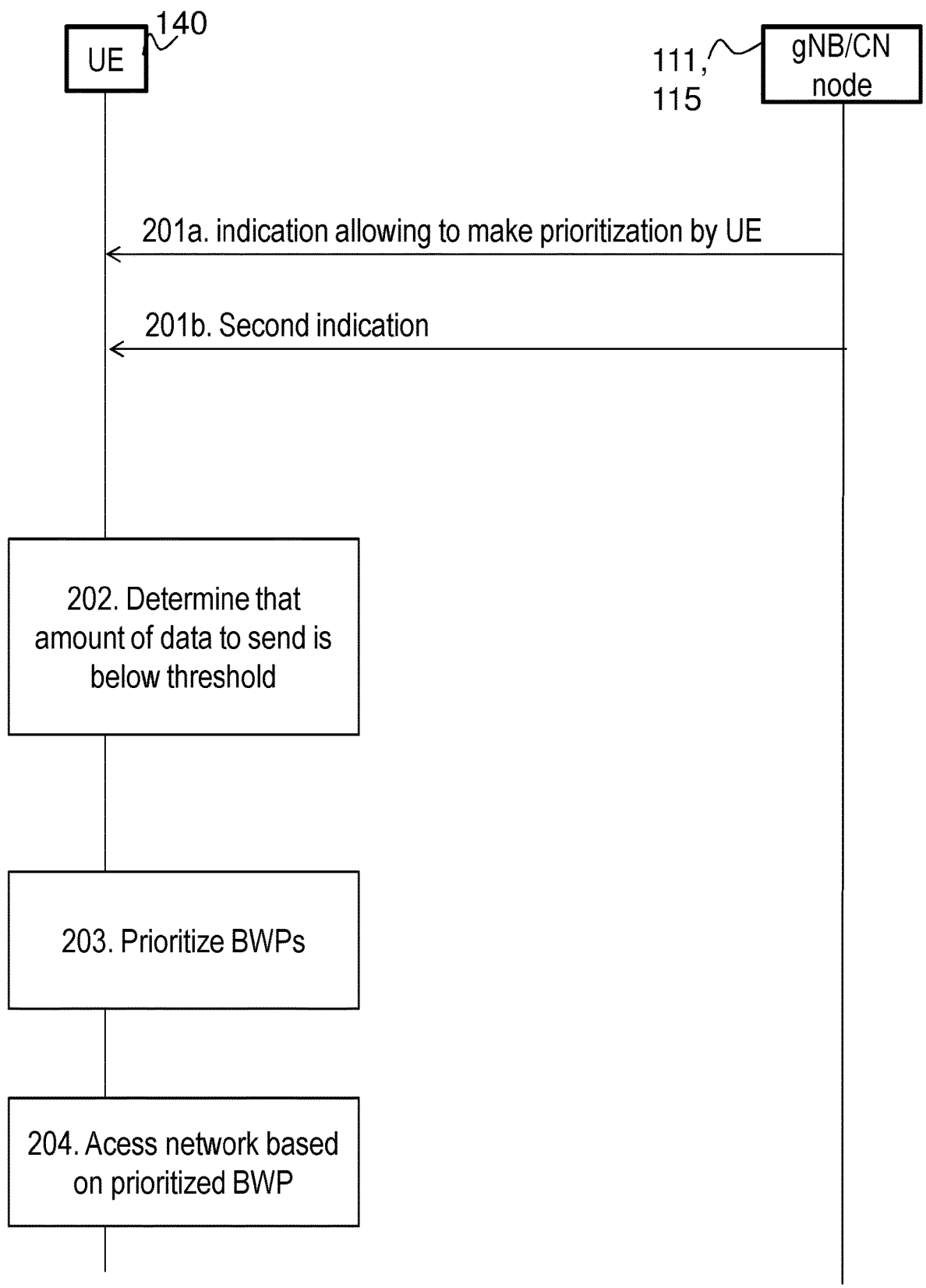
FIG. 2 is a combined flowchart and signalling diagram illustrating embodiments of a method for controlling access to an unlicensed radio frequency band.

Embodiments will firstly be described by describing the interactions of the wireless communications device 140 with the network node 111, 115 with reference to a combined signaling diagram and flow chart illustrated in FIG. 2, and with continued reference to FIG. 1A.

In an example scenario in which embodiments herein may be applied the wireless communications device 140 may have a small amount of data to transmit on the unlicensed radio frequency band 150. Thus it may be advantageous for the wireless communications device 140 to access a radio channel, or in other words access the unlicensed radio frequency band 150, with a smaller part of the system bandwidth of the unlicensed radio frequency band 150.

Action 201a

The wireless communications device 140 receives, from the network node 111, 115, an indication enabling the wireless communications device 140 to make a prioritization among the plurality of radio frequency bandwidth parts BWP1-BWP6. In other words, the indication allows the wireless communications device 140 to make the prioritization among the plurality of radio frequency bandwidth parts BWP1-BWP6.

The indication may e.g. be a command and/or a request to make a prioritization among the plurality of radio frequency bandwidth parts BWP1-BWP6. Receiving the indication may also comprise not receiving a prioritized list of the radio frequency bandwidth parts BWP1-BWP6.

This action is related to action 301 and action 601 below.

Action 201b

In some embodiments the wireless communications device 140 receives a second indication from the network node 111, 115. The second indication indicates to the wireless communications device 140 on which grounds to make the prioritization, e.g. which prioritization algorithm to use, or on which measurements, measures and/or parameters the prioritization is to be based. For example, the second indication may indicate that the prioritization among the plurality of radio frequency bandwidth parts BWP1-BWP6 is to be based on a result of channel sensing.

The second indication may be transmitted, or in other words signalled, in the same message as the indication enabling the wireless communications device 140 to make the prioritization, or in separate messages.

By transmitting the second indication the network node 111, 115 may control on which grounds the wireless communications device 140 makes the prioritization, e.g. which prioritization algorithm the wireless communications device 140 uses. Thus network and operator may be in control of the UE behavior.

This action is related to action 602 below.

Action 202

In some embodiments the wireless communications device 140 performs prioritization conditionally upon determination that an amount of data to transmit from the wireless communications device 140 is below a predetermined threshold amount of data. For example, the data may not require the whole of the unlicensed radio frequency band 150. If the amount of data to transmit is above the predetermined threshold amount of data the wireless communications device 140 may instead assume that the entire system bandwidth is needed for the transmission. An advantage of the above determination is that the wireless communications device 140 only performs prioritization when it is needed, and thus processing resources may be saved compared to if the wireless communications device 140 performs prioritization for every transmission, even though all frequency bands may be needed for some of the transmissions.

This action is related to action 302 below.

Action 203

The wireless communications device 140 prioritizes among the plurality of radio frequency bandwidth parts BWP1-BWP6 in response to receiving the indication in action 201a.

For example, the wireless communications device 140 may take into consideration historical pass/fail statistics of LBT attempts or packet transmissions to determine which of the plurality of radio frequency bandwidth parts BWP1-BWP6, e.g which bandwidth parts, are more likely to be successful for channel sensing and/or transmission and/or reception than others. Thereby the wireless communications device 140 may prioritize such radio frequency bands higher for upcoming transmission slots.

An advantage of the prioritization by the wireless communications device 140 is that the need for signalling of such priority by the wireless communication network 101 is reduced. Since prioritization, e.g. updating of the priority list 401, may be needed frequently e.g. with intervals in the order of seconds, the signaling within the wireless communication network 101 may be reduced significantly.

The wireless communication network 101, e.g. the network node 111, 115, may configure the wireless communications device 140 by lower layer or Radio Resource Control RRC signaling to use a certain priority function or algorithm. In other embodiments the wireless communications device 140 will use a certain priority function if a radio frequency band or a priority among radio frequency bandwidth parts is not signaled by the wireless communication network 101 for an upcoming transmission.

This action is related to action 303 below.

Action 204

The wireless communications device 140 accesses the unlicensed radio frequency band 150 in accordance with the prioritization.

Accessing the unlicensed radio frequency band 150 may comprise performing channel sensing and/or transmitting data and/or receiving data on at least one of the plurality of radio frequency bandwidth parts BWP1-BWP6.

This action is related to action 304 below.

Figure 3:
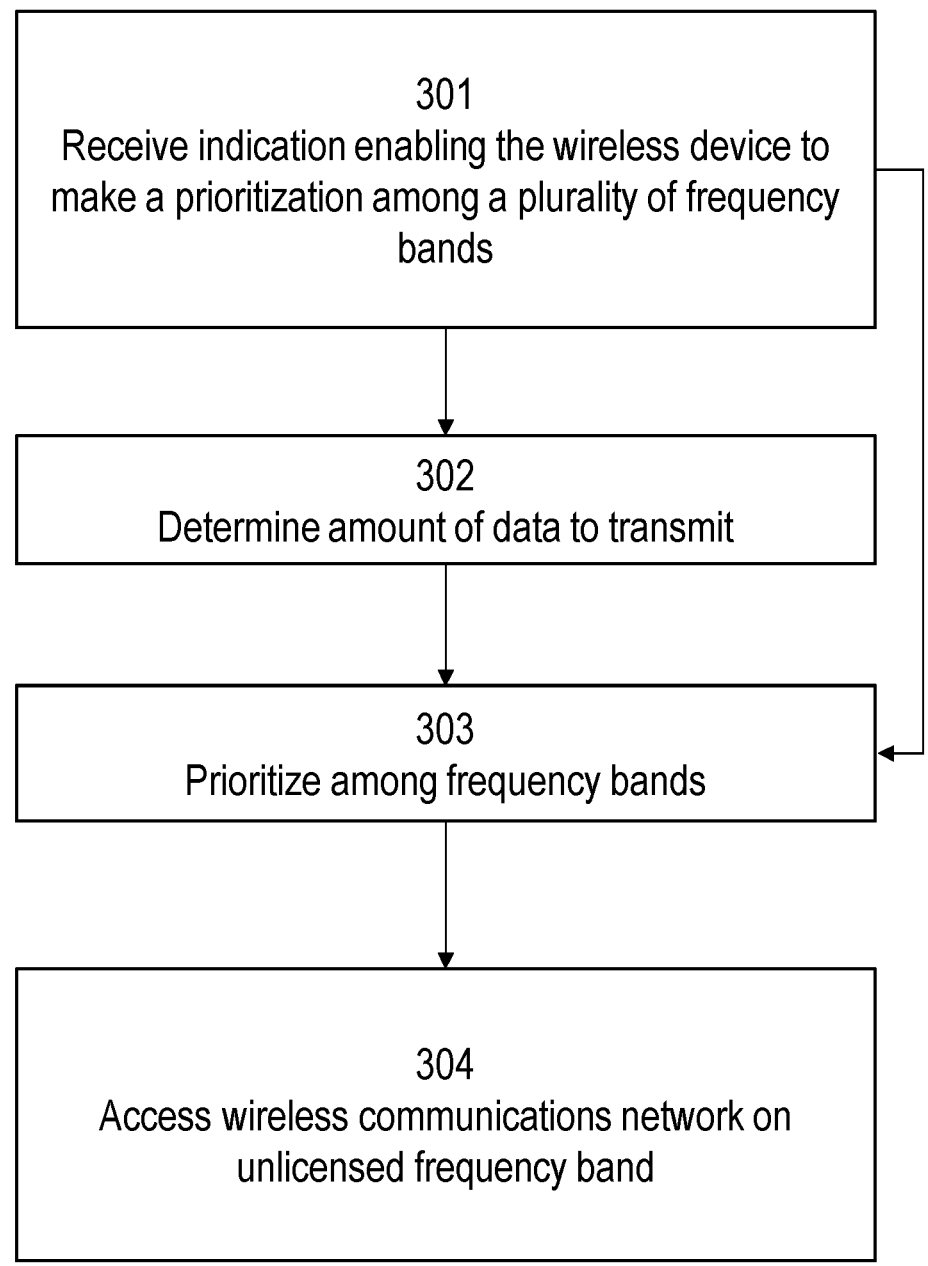
FIG. 3 is a flowchart illustrating embodiments of a method performed by a wireless communications device.

Embodiments related to the wireless communications device 140 will now follow. FIG. 3 illustrates a flow chart with actions performed by the wireless communications device 140 for accessing the unlicensed radio frequency band 150.

Action 301

The wireless communications device 140 receives, from the network node 111, 115, the indication enabling the wireless communications device 140 to make the prioritization among the plurality of radio frequency bandwidth parts BWP1-BWP6. In other words, the indication allows the wireless communications device 140 to make the prioritization among the plurality of radio frequency bandwidth parts BWP1-BWP6.

Since the wireless communications device 140 receives the indication enabling the wireless communications device 140 to make the prioritization among the plurality of radio frequency bandwidth parts BWP1-BWP6 the wireless communications device 140 is able to access the unlicensed radio frequency band 150 in accordance with its own prioritization, without receiving prioritizations from the wireless communications network 101.

Therefore, the wireless communications device 140 is able to optimize the accessing of the unlicensed radio frequency band 150, e.g. optimize the selection of one of the plurality of radio frequency bandwidth parts BWP1-BWP6 with respect to e.g. listen before talk success rate, while reducing the overhead signaling in the wireless communications network 101.

An advantage of this is that radio access resources are saved since less radio access resources are needed to provide the indication enabling the wireless communications device 140 to make the prioritization compared to providing information about prioritized radio frequency bandwidth parts from the wireless communications network 101. For example, the frequency as well as the actual content of control messages from the wireless communications network 101 may be reduced.

In some embodiments the received indication enabling the wireless communications device 140 to make the prioritization is valid for two or more consecutive accesses to the unlicensed radio frequency band 150. In that way the frequency of control messages from the wireless communications network 101 may be reduced and more radio access resources may be saved since less radio access resources are needed in order to prioritize among the plurality of radio frequency bands 150.

In some further embodiments the received indication enabling the wireless communications device 140 to make the prioritization is valid for a predefined time period and/or for a limited amount of data.

In yet some further embodiments the received indication enabling the wireless communications device 140 to make the prioritization is valid until an indication, such as a list, of prioritized radio frequency bandwidth parts BWP1-BWP6 is provided from the wireless communications network 101.

In the above embodiments the duration of the validity of the indication enabling the wireless communications device 140 to make the prioritization may be controlled by the network node 111, 115 and thus by the wireless communications network 101. Thus, by controlling the validity the frequency of control messages from the wireless communications network 101 may be reduced at the same time as the wireless communication network 101 is able to dynamically control whether or not to enable the wireless communications device 140 to make the prioritization. For example, it may be more advantageous for the wireless communication network 101 to allow the wireless communications device 140 to make the prioritization during certain traffic scenarios than during other traffic scenarios.

This action is related to action 201a above and action 601 below.

Action 302

In some embodiments the wireless communications device 140 determines that the amount of data to transmit from the wireless communications device 140 is below the predetermined threshold amount of data.

For these embodiments the wireless communications device 140 prioritizes among the plurality of radio frequency bandwidth parts BWP1-BWP6 in response to determining that the amount of data to transmit from the wireless communications device 140 is below the predetermined threshold amount of data, and in response to receiving the indication enabling the wireless communications device 140 to make the prioritization.

An advantage of the above determination is that the wireless communications device 140 only performs prioritization when it is needed, and thus processing resources may be saved compared to if the wireless communications device 140 performs prioritization for every transmission, even though all frequency bands may be needed for some of the transmissions.

This action is related to action 202 above.

Action 303

The wireless communications device 140 prioritizes among the plurality of radio frequency bandwidth parts BWP1-BWP6 in response to receiving the indication enabling the wireless communications device 140 to make the prioritization among the plurality of radio frequency bandwidth parts BWP1-BWP6.

The prioritizing 202, 302 among the plurality of radio frequency bandwidth parts BWP1-BWP6 may be based on any one or more of:
  a result of channel sensing and/or transmission performance and/or reception performance among the plurality of radio frequency bandwidth parts BWP1-BWP6;
  a measure of channel occupancy among the plurality of radio frequency bandwidth parts BWP1-BWP6; and
  a hopping sequence among the plurality of radio frequency bandwidth parts BWP1-BWP6.

In some embodiments the prioritizing among the plurality of radio frequency bandwidth parts BWP1-BWP6 comprises prioritizing frequency bands for which the results of channel sensing and/or transmission performance and/or reception performance have a success rate at or over a threshold success rate.

In some other embodiments the prioritizing among the plurality of radio frequency bandwidth parts BWP1-BWP6 comprises prioritizing frequency bands for which the channel occupancy is below a threshold channel occupancy.

The prioritizing among the plurality of radio frequency bandwidth parts BWP1-BWP6 may further comprise prioritizing a first radio frequency band over a second radio frequency band, wherein a first measure of channel occupancy of the first radio frequency band is lower than a second measure of channel occupancy of the second radio frequency band.

The prioritizing among the plurality of radio frequency bandwidth parts BWP1-BWP6 may further comprise prioritizing the first radio frequency band over the second radio frequency band, wherein a first success rate of channel sensing and/or transmission performance and/or reception performance of the first radio frequency band is higher than a second success rate of channel sensing and/or transmission performance and/or reception performance of the second radio frequency band.

The following will describe in some more detail how the prioritization may be performed in embodiments herein.

For example, the wireless communications device 140 may take into consideration historical pass/fail statistics of LBT attempts or packet transmissions to determine which of the plurality of radio frequency bandwidth parts BWP1-BWP6, e.g. which bandwidth parts, are more likely to be successful for channel sensing and/or transmission and/or reception than others. Thereby the wireless communications device 140 may prioritize such radio frequency bands higher for upcoming transmission slots.

Figure 4:
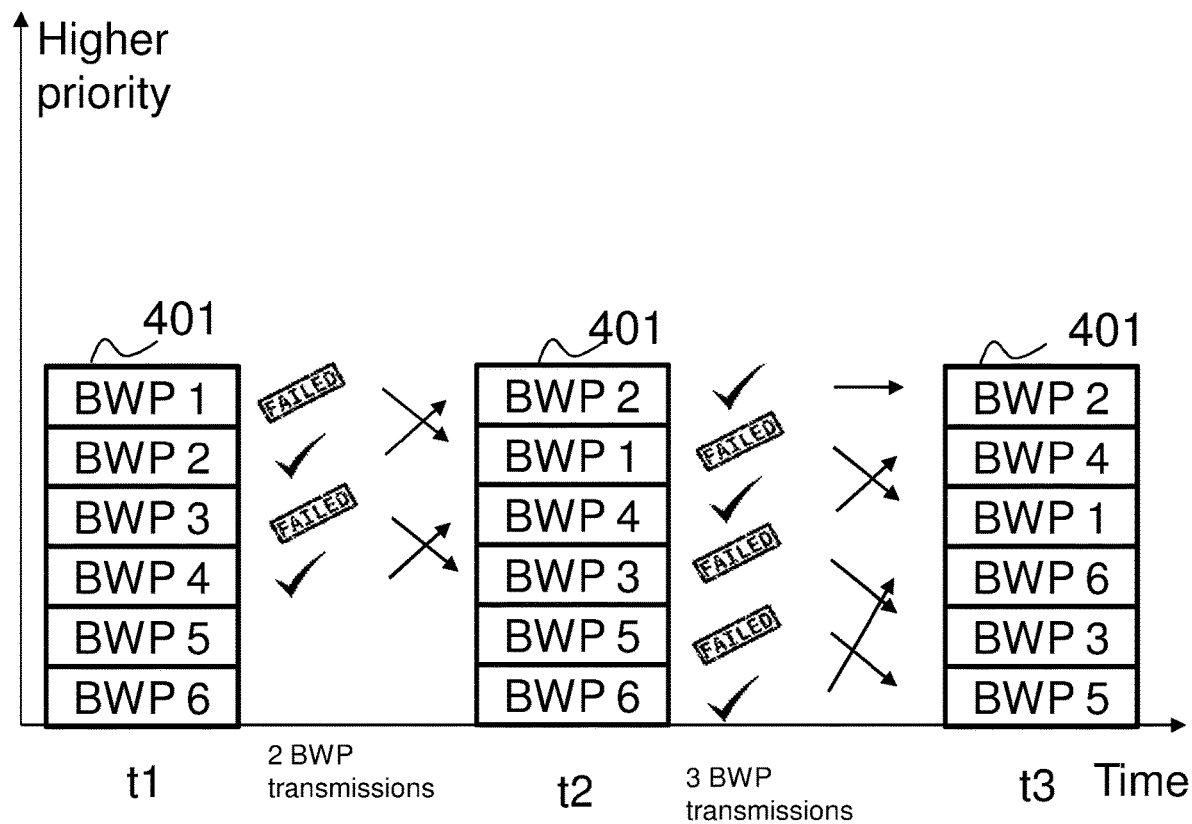
FIG. 4 is a schematic block diagram illustrating embodiments herein.

An example algorithm for how this could work is illustrated in FIG. 4, where a priority list 401 is updated for each LBT attempt. In FIG. 4 the priority list 401 is illustrated at three different times t1, t2 and t3. Initially at time t1 the priority list is prioritized such that a first radio frequency band BWP1 has the highest priority, a second radio frequency band BWP2 has the next highest priority and so on.

Then the wireless communications device 140 listens to the first radio frequency band BWP1 and if energy is below a threshold the wireless communications device 140 transmits on the first radio frequency band BWP1. Otherwise fail means that the LBT failed in that the sensed radio energy was too high. There is no transmission attempt on the failed radio frequency bandwidth parts BWP2 and BWP4.

In this example a successful attempt raises a radio frequency band one step, indicated with an upwards arrow, and a missed attempt decreases the radio frequency band one step, indicated by a downwards arrow, in the priority list 401. If two radio frequency bandwidth parts ends up on the same priority level, the radio frequency band that has most recently succeeded may get the higher priority. This is illustrated with the arrows before time t3 i.e. during the second prioritization after the second LBT attempt and after the second transmission.

In some other embodiments the wireless communications device 140 may use a channel occupancy measurement to determine which of the plurality of radio frequency bandwidth parts BWP1-BWP6 has the lowest use. A channel occupancy measurement is intended to provide information about which part of a radio spectrum that is typically used more than other parts of the radio spectrum. A channel occupancy metric may e.g. be an average detected energy in a radio frequency band over multiple measurements of the detected energy. The detected energy may be obtained by integration of the radio intensity over a frequency band.

Figure 5A:
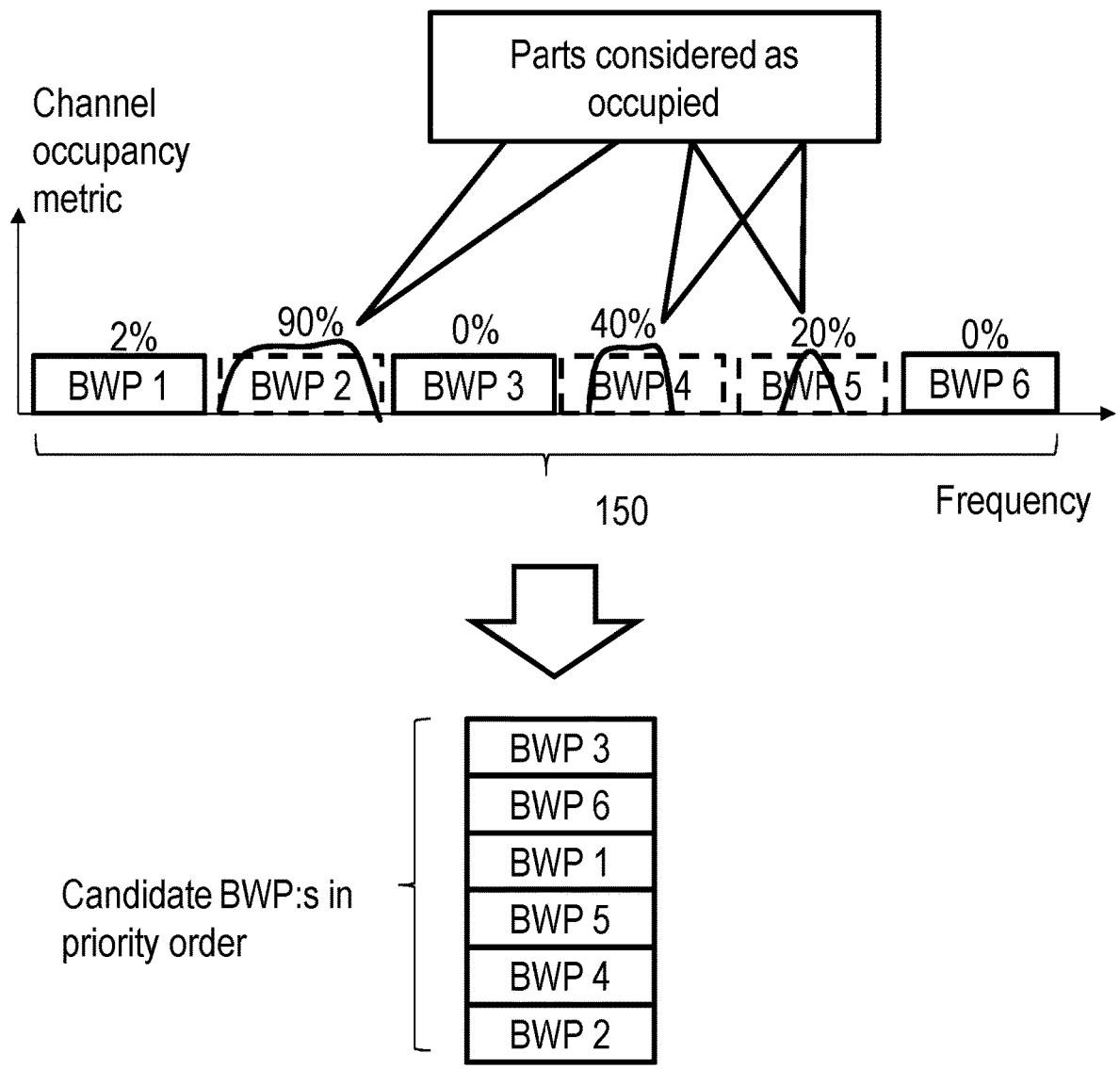
FIG. 5A is a schematic block diagram illustrating a partition of a radio frequency band and embodiments herein.

In embodiments herein such a channel occupancy measurement may be used for prioritizing BWPs. This would enable the wireless communications network 101 to achieve a prioritization of BWPs which is specific for the wireless communications device 140 without signaling of such priority from the wireless communications network 101. The wireless communications network 101 may configure the wireless communications device 140 by lower layer- or RRC signaling to use this priority function, or it may be understood by wireless communications device 140 to use this function if a BWP is not signaled by the wireless communications network 101 for an upcoming transmission. An illustration of how this function may be used is shown in FIG. 5A. In FIG. 5A BWP 2, BWP 4 and BWP 5 are considered as occupied, due to large channel occupancy levels of 90%, 40% and 20% respectively. A threshold channel occupancy level may for example be 20%.

The above two embodiments are targeting to achieve a usage of BWPs where the probability for successful LBT is as high as possible for each attempt. However, in order to spread out the usage of the spectrum over a large part of the available radio spectrum, one aspect to consider is whether to semi-statically occupy selected parts of the radio spectrum, or whether to spread the usage of the spectrum, and thereby interference caused to other wireless nodes, such as other wireless communications devices and base stations, over the radio spectrum.

One method to achieve a more distributed interference may be to define a hopping sequence for BWP:s for the LBT priority.

Figure 5B:
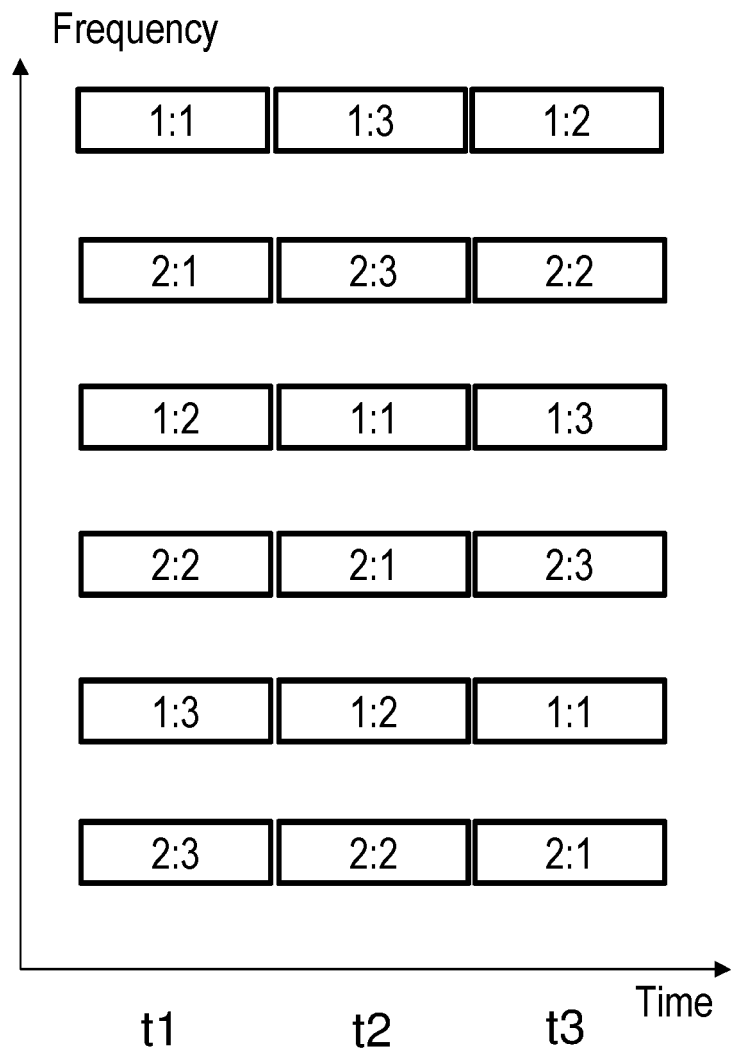
FIG. 5B is a schematic block diagram illustrating further embodiments herein.
Figure 5C:
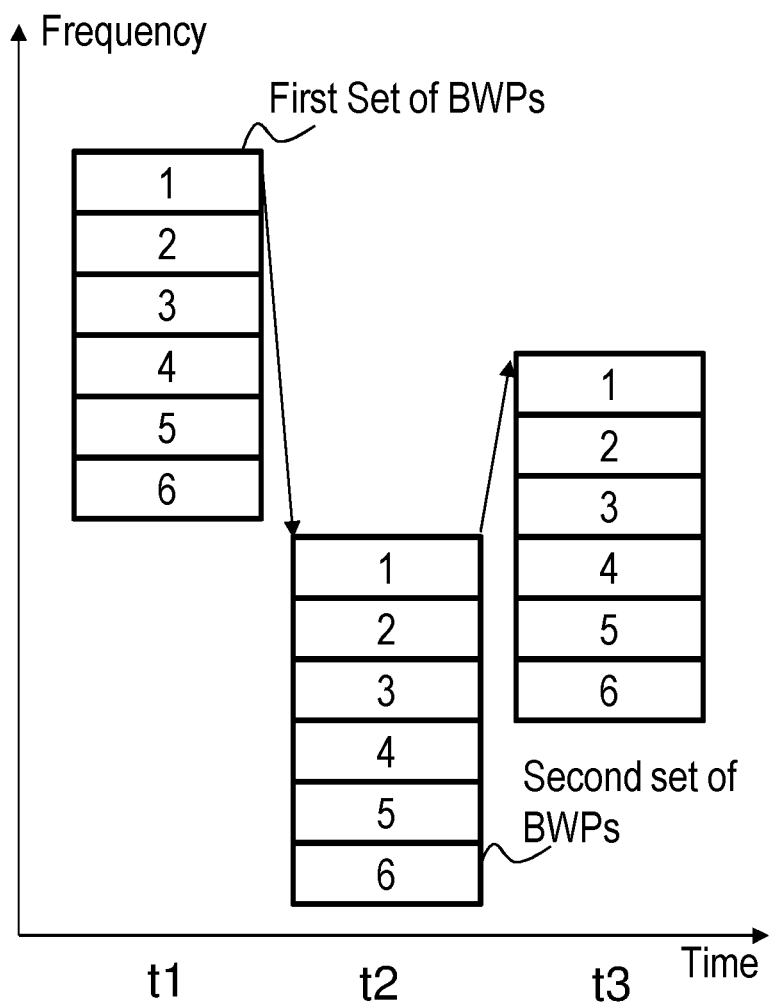
FIG. 5C is a schematic block diagram illustrating further embodiments herein.

Examples of how to specify a suitable hopping sequence are illustrated in FIGS. 5B and 5C.

A first example may be to specify a set of highest priority BWP:s that are switched between as the first LBT attempt, and a set of second highest priority BWP:s that are switched between for the second LBT attempt etc.

The diagram of FIG. 5B illustrates a priority order 1-3 within two different priority groups 1-2, i.e. groups 1-2 of BWPs, used for LBT at three different times t1-t3. The numbers in the boxes have the following meaning: group:priority. At time t1 the first group 1 is prioritized over the second group 2. The LBT priority order in group 1 is given by: 1:1, 1:2, 1:3. If any of these BWPs of group 1 are successful, the next BWP to use is from group 2. The priority order within group 2 is: 2:1, 2:2, 2:3. After each transmission, the order in each group is rotated to form a hopping pattern. Of course more than two groups may be used.

FIG. 5C illustrates another option, which is to use a first set of BWPs with a first BWP order for a first transmission slot t1 and then modify the definition of the set of BWPs for the next transmission slot t2, e.g. by adding a hopping pattern as a function that gives a delta-frequency to move the allocation of BWPs frequency wise for each transmission attempt. I.e. the hopping function may provide an applied frequency change per transmission.

These two types of hopping may also be combined. The network may via RRC signaling configure if it should be used. If multiple hopping schemes are defined the network may define which one to use.

An advantage of the prioritization by the wireless communications device 140 is that the need for signalling of such priority by the wireless communication network 101 is reduced. Since prioritization, e.g. updating of the priority list 401, may be needed frequently, e.g. with intervals in the order of seconds, the signaling within the wireless communication network 101 may be reduced significantly.

This action is related to action 203 above.

Action 304

The wireless communications device 140 accesses the unlicensed radio frequency band 150 in accordance with the prioritization.

Accessing the unlicensed radio frequency band 150 may comprise performing channel sensing and/or transmitting data and/or receiving data on at least one of the plurality of radio frequency bandwidth parts BWP1-BWP6.

This action is related to action 204 above.

Figure 6:
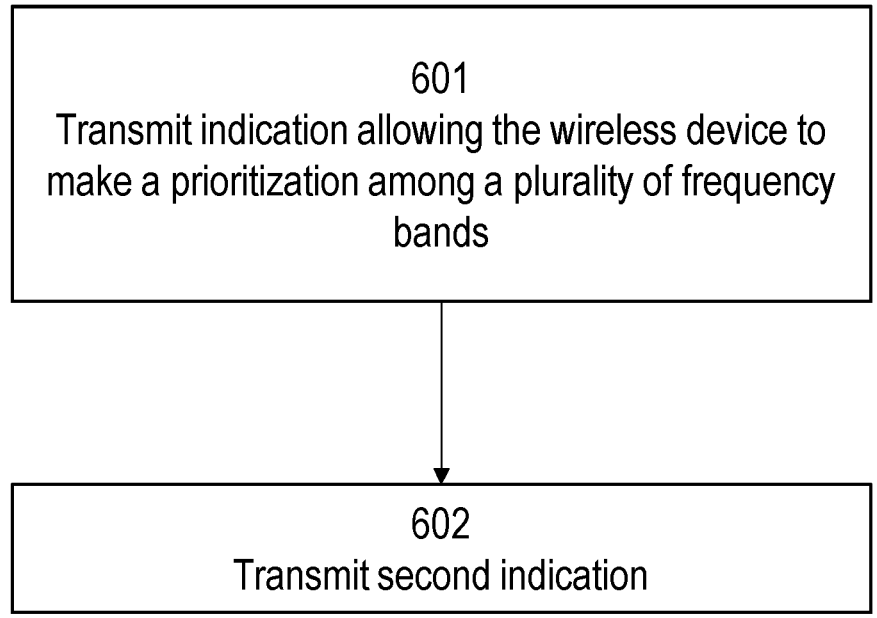
FIG. 6 is a flowchart illustrating embodiments of a method performed by a network node.

Embodiments related to the network node 111, 115 will now follow. FIG. 6 illustrates a flow chart with actions performed by the network node 111, 115 for controlling access to the unlicensed radio frequency band 150.

Action 601

The network node 111, 115 transmits the indication enabling the wireless communications device 140 to make the prioritization among the plurality of radio frequency bandwidth parts BWP1-BWP6 comprised in the unlicensed radio frequency band 150. The plurality of radio frequency bandwidth parts BWP1-BWP6 are to be used for accessing the unlicensed radio frequency band 150 to communicate in the wireless communications network 101. The indication is transmitted to the wireless communications device 140. The indication may be transmitted with lower level signaling or RRC signaling.

Since the network node 111, 115 transmits the indication enabling the wireless communications device 140 to make the prioritization among the plurality of radio frequency bandwidth parts BWP1-BWP6 the wireless communications device 140 is able to access the unlicensed radio frequency band 150 in accordance with its own prioritization, without receiving prioritizations from the wireless communications network 101.

As mentioned above in relation to action 301, an advantage of this is that radio access resources are saved since less radio access resources are needed to provide the indication enabling the wireless communications device 140 to make the prioritization compared to providing information about prioritized radio frequency bandwidth parts from the wireless communications network.

This action is related to action 201*a* and action 301 above.

Action 602

In some embodiments the network node 111, 115 further controls the access to the unlicensed radio frequency band 150 by transmitting to the wireless communications device 140 the second indication indicating that the prioritization among the plurality of radio frequency bandwidth parts BWP1-BWP6 is to be based on any one or more of:
- the result of channel sensing and/or transmission performance and/or reception performance among the plurality of radio frequency bandwidth parts BWP1-BWP6;
- the measure of channel occupancy among the plurality of radio frequency bandwidth parts BWP1-BWP6; and
- the hopping sequence among the plurality of radio frequency bandwidth parts BWP1-BWP6.

The second indication may be transmitted, or in other words signalled, in the same message as the indication enabling the wireless communications device 140 to make the prioritization, or in separate messages.

By transmitting the second indication the network node 111, 115 may control on which grounds the wireless communications device 140 makes the prioritization, e.g. which prioritization algorithm the wireless communications device 140 uses.

This action is related to action 201*b* above.

Embodiments herein may be performed in the wireless communications device 140. The wireless communications device 140 may comprise the modules depicted in FIG. 7 for accessing the unlicensed radio frequency band 150. Those skilled in the art will appreciate that the different modules described below may also be referred to as e.g. units or the like.

The wireless communications device 140 may comprise a transmitter 760*a* and a receiver 760*b* for wireless signals.

The wireless communications device 140 is configured to, e.g. by means of a receiving module 710, receive the indication enabling the wireless communications device 140 to make the prioritization among the plurality of radio frequency bandwidth parts BWP1-BWP6 comprised in the unlicensed radio frequency band 150.

The receiving module 710 may be implemented by a processor 780 and/or the receiver 760*b* of the wireless communications device 140.

The wireless communications device 140 is further configured to, e.g. by means of an accessing module 720, access the unlicensed radio frequency band 150 in accordance with the prioritization.

The wireless communications device 140 may be configured to access the unlicensed radio frequency band 150 by performing channel sensing and/or transmitting data and/or receiving data on at least one of the plurality of radio frequency bandwidth parts BWP1-BWP6.

The accessing module 720 may be implemented by the processor 780 of the wireless communications device 140.

The wireless communications device 140 may further be configured to, e.g. by means of a prioritizing module 730, prioritize among the plurality of radio frequency bandwidth parts BWP1-BWP6, in response to receiving the indication enabling the wireless communications device 140 to make the prioritization among the plurality of radio frequency bandwidth parts BWP1-BWP6.

In some embodiments the wireless communications device 140 is configured to prioritize among the plurality of radio frequency bandwidth parts BWP1-BWP6 based on any one or more of:
- the result of channel sensing and/or transmission performance and/or reception performance among the plurality of radio frequency bandwidth parts BWP1-BWP6;
- the measure of channel occupancy among the plurality of radio frequency bandwidth parts BWP1-BWP6; and
- the hopping sequence among the plurality of radio frequency bandwidth parts BWP1-BWP6.

The prioritizing module 730 may be implemented by the processor 780 of the wireless communications device 140.

In some embodiments the wireless communications device 140 is further configured to, e.g. by means of a determining module 740, determine that the amount of data to transmit from the wireless communications device 140 is below the predetermined threshold amount of data.

For these embodiments the wireless communications device 140 is configured to prioritize among the plurality of radio frequency bandwidth parts BWP1-BWP6 in response to determining that the amount of data to transmit from the wireless communications device 140 is below the predetermined threshold amount of data, and in response to receiving the indication enabling the wireless communications device 140 to make the prioritization.

The determining module 740 may be implemented by the processor 780 of the wireless communications device 140.

Embodiments herein may be performed in the network node 111, 115. The network node 111, 115 may comprise the modules depicted in FIG. 8 for controlling access to the unlicensed radio frequency band 150.

The network node 111, 115 may comprise a transmitter 860*a* and a receiver 860*b* for wireless signals.

The network node 111, 115 is configured to, e.g. by means of the transmitting module 810, transmit the indication enabling the wireless communications device 140 to make the prioritization among the plurality of radio frequency bandwidth parts BWP1-BWP6 comprised in the unlicensed radio frequency band 150. The indication is transmitted to the wireless communications device 140.

The transmitting module 810 may be implemented by a processor 880 and/or a transmitter 860*a* of the network node 111, 115.

The network node 111, 115 may be further configured to, e.g. by means of the transmitting module 810, control the usage of the unlicensed radio frequency band 150 by being configured to transmit to the wireless communications device 140 the second indication indicating that the prioritization among the plurality of radio frequency bandwidth parts BWP1-BWP6 is to be based on any one or more of:
- the result of channel sensing and/or transmission performance and/or reception performance among the plurality of radio frequency bandwidth parts BWP1-BWP6;
- the measure of channel occupancy among the plurality of radio frequency bandwidth parts BWP1-BWP6; and
- the hopping sequence among the plurality of radio frequency bandwidth parts BWP1-BWP6.

Some embodiments herein may also be described as a system comprising the network node 111, 115 and the wireless communications device 140. Within the system the network node 111, 115 is configured to transmit, to the wireless communications device 140, the indication enabling the wireless communications device 140 to make the prioritization among the plurality of radio frequency bandwidth parts BWP1-BWP6. The wireless communications device 140 is, as mentioned above, configured to receive from the network node 111, 115 the indication, and access the unlicensed radio frequency band 150 in accordance with the prioritization.

Figure 7:
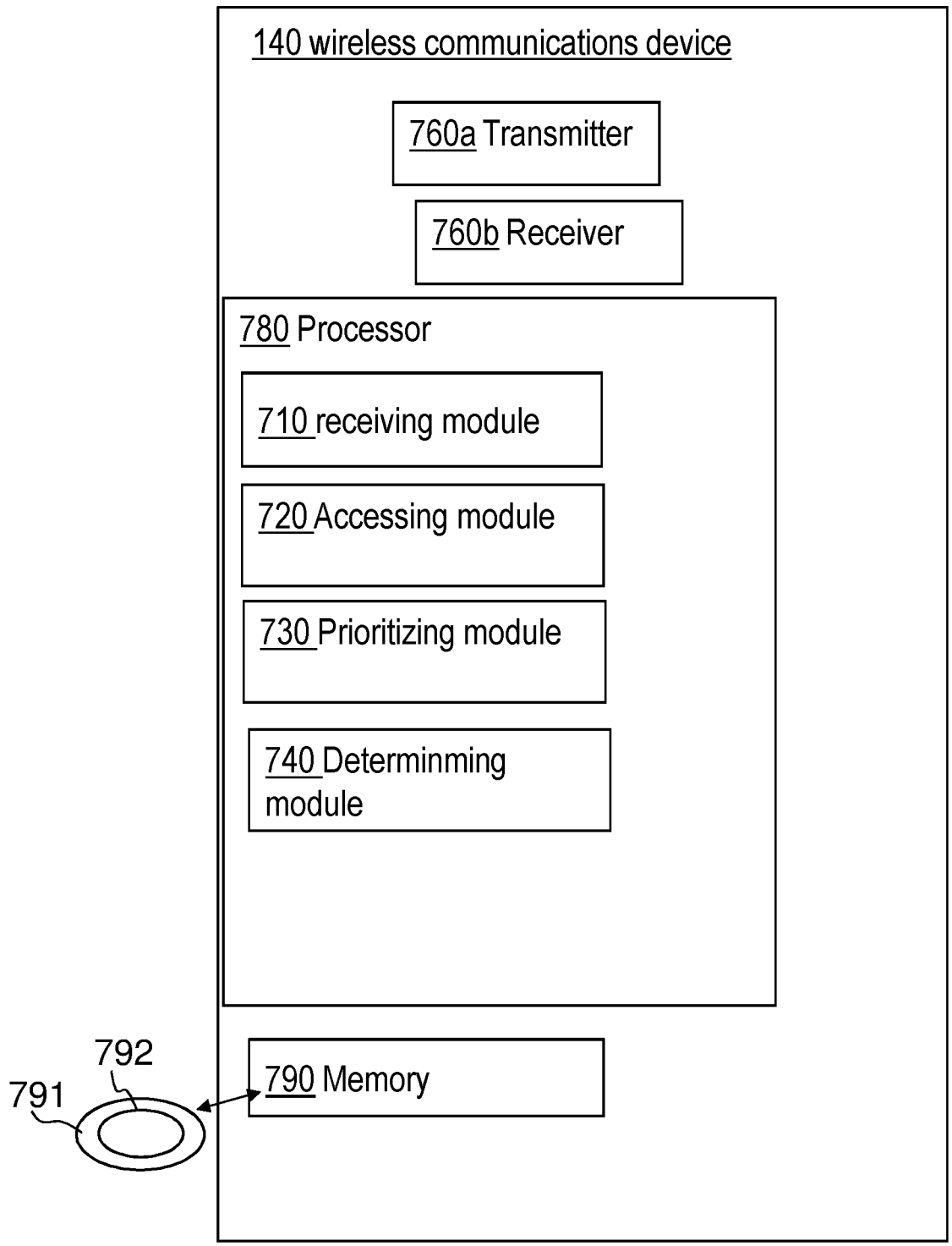
FIG. 7 is a schematic block diagram illustrating embodiments of a wireless communications device.
Figure 8:
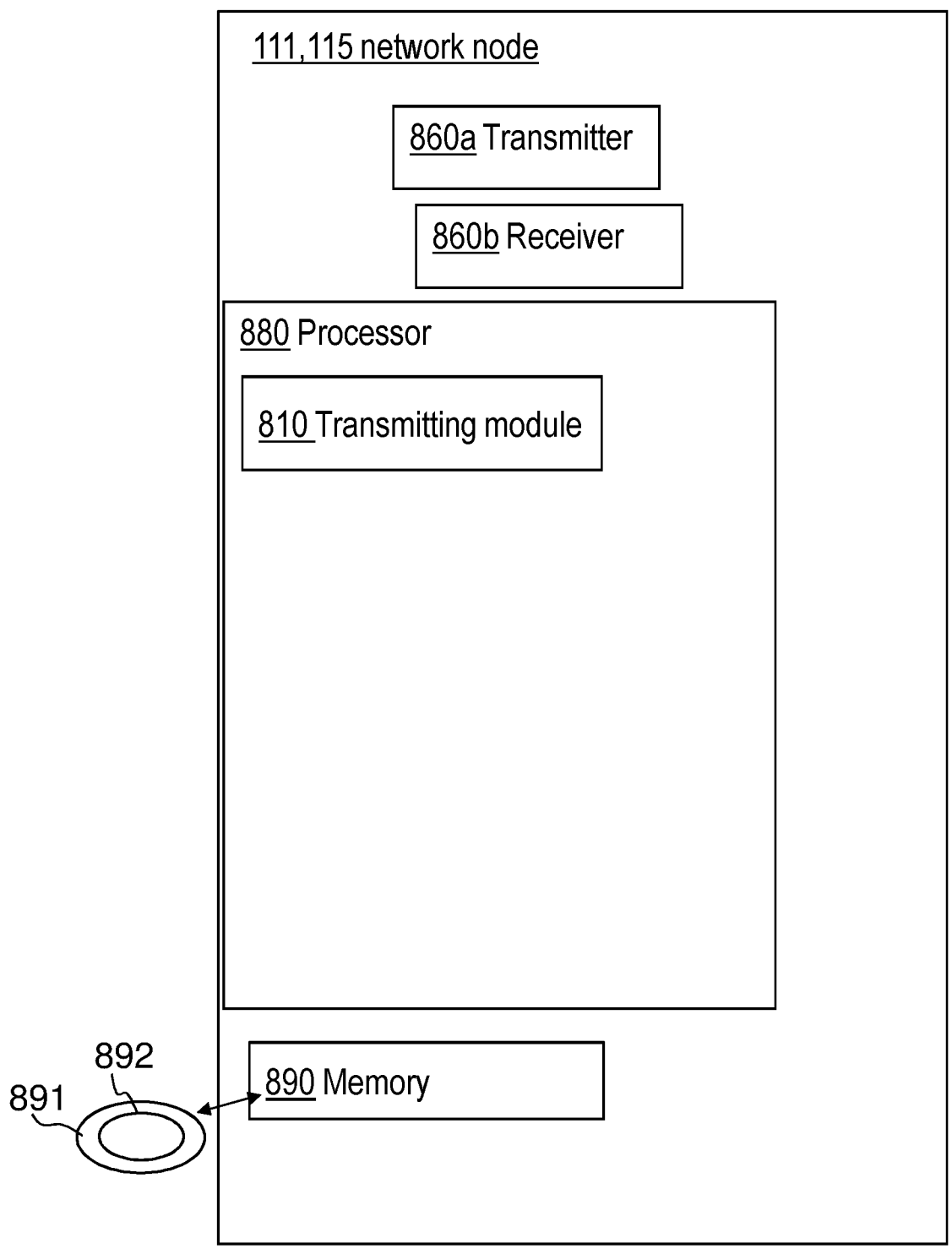
FIG. 8 is a schematic block diagram illustrating embodiments of a network node.

The embodiments herein may be implemented through one or more processors, such as the processor 780 in the wireless communications device 140 depicted in FIG. 7, and the processor 880 in the network node 111, 115 depicted in FIG. 8 together with computer program code for performing the functions and actions of the embodiments herein. The program code mentioned above may also be provided as a computer program product 791, 891, for instance in the form of a data carrier carrying computer program code 792, 892 for performing the embodiments herein when being loaded into the network node 111, 115 and the wireless communications device 140. One such carrier may be in the form of a CD ROM disc. It is however feasible with other data carriers such as a memory stick. The computer program code may furthermore be provided as pure program code on a server and downloaded to the network node 111, 115 and the wireless communications device 140.

Thus, the methods according to the embodiments described herein for the network node 111, 115 and the wireless communications device 140 may be implemented by means of a computer program product, comprising instructions, i.e., software code portions, which, when executed on at least one processor, cause the at least one processor to carry out the actions described herein, as performed by the network node 111, 115 and the wireless communications device 140. The computer program product may be stored on a computer-readable storage medium. The computer-readable storage medium, having stored there on the computer program, may comprise the instructions which, when executed on at least one processor, cause the at least one processor to carry out the actions described herein, as performed by the network node 111, 115 and the wireless communications device 140. In some embodiments, the computer-readable storage medium may be a non-transitory computer-readable storage medium.

The wireless communications device 140 and the network node 111, 115 may further each comprise a memory 790, 890, comprising one or more memory units. The memory 790,890 is arranged to be used to store obtained information such as the indication enabling the wireless communications device 140 to make a prioritization among the plurality of radio frequency bandwidth parts BWP1-BWP6, results of channel sensing and/or transmission performance and/or reception performance, measures of channel occupancy, hopping sequences, thresholds etc. to perform the methods herein when being executed in the network node 111, 115, and the wireless communications device 140.

Further, those skilled in the art will also appreciate that the different modules described above may refer to a combination of analog and digital circuits, and/or one or more processors configured with software and/or firmware, e.g. stored in the memory, that when executed by the one or more processors, such as the processors in the network node 111, 115 and the wireless communications device 140 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

Although specific terms may be employed herein, they are used in a generic and descriptive sense only and not for purposes of limitation.

Therefore, the above embodiments should not be taken as limiting the scope, which is defined by the appending claims.

Note that although terminology from 3GPP NR has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first radio frequency band and a second radio frequency band should be considered to be non-limiting and does in particular not imply a certain hierarchical relation between the two.

The invention claimed is:

1. A method, performed by a wireless communications device for accessing a predefined system bandwidth within an unlicensed radio frequency band, the wireless communications device being configured, by a wireless communications network comprising a network node, to operate within the predefined system bandwidth which comprises a plurality of bandwidth parts configured by the wireless communications network, the method comprising:
    receiving, from the network node, downlink control information (DCI) including an explicit indication requesting the wireless communications device to make a prioritization among the plurality of bandwidth parts;
    prioritizing, in response to receiving the indication, among the plurality of bandwidth parts without prioritization information from the network node;
    selecting at least one bandwidth part of the plurality of bandwidth parts in accordance with the prioritization; and
    accessing the at least one bandwidth part selected.

2. The method according to claim 1, wherein the accessing the unlicensed radio frequency band comprises accessing the unlicensed frequency within a bandwidth less than the system bandwidth.

3. The method according to claim 1, wherein the accessing the unlicensed radio frequency band comprises accessing the unlicensed frequency within one or more bandwidth parts.

4. The method according to claim 1, wherein the accessing the unlicensed radio frequency band comprises accessing the unlicensed frequency within a single bandwidth part.

5. The method according to claim 1, wherein the accessing the unlicensed radio frequency band comprises performing channel sensing and/or transmitting data and/or receiving data on at least one of the plurality of bandwidth parts.

6. The method according to claim 1, wherein the prioritizing among the plurality of bandwidth parts is based on any one or more of:
    a result of channel sensing and/or transmission performance and/or reception performance among the plurality of bandwidth parts;
    a measure of channel occupancy among the plurality of bandwidth parts; and
    a hopping sequence among the plurality of bandwidth parts.

7. The method according to claim 1, wherein the prioritizing among the plurality of bandwidth parts comprises prioritizing frequency bands for which the results of channel sensing and/or transmission performance and/or reception performance have a success rate at or over a threshold success rate.

8. The method according to claim 1, wherein the prioritizing among the plurality of bandwidth parts comprises prioritizing frequency bands for which the channel occupancy is below a threshold channel occupancy.

9. The method according to claim 1, wherein the prioritizing among the plurality of bandwidth parts comprises prioritizing a first bandwidth part over a second bandwidth part, wherein a first measure of channel occupancy of the first bandwidth part is lower than a second measure of channel occupancy of the second bandwidth part.

10. The method according to claim 1, wherein the prioritizing among the plurality of bandwidth parts comprises prioritizing the first bandwidth part over the second bandwidth part, wherein a first success rate of channel sensing and/or transmission performance and/or reception performance of the first bandwidth part is higher than a second success rate of channel sensing and/or transmission performance and/or reception performance of the second bandwidth part.

11. The method according to claim 1, wherein the received indication requesting the wireless communications device to make the prioritization is valid for two or more consecutive accesses.

12. The method according to claim 1, further comprising:
determining that an amount of data to transmit from the wireless communications device is below a predetermined threshold amount of data, and in response to receiving the indication enabling the wireless communications device to make the prioritization and in response to determining that the amount of data to transmit from the wireless communications device is below a predetermined threshold amount of data;
prioritizing among the plurality of bandwidth parts.

13. The method according to claim 1, wherein the prioritizing among the plurality of bandwidth parts is based on a parameter respectively associated with the plurality of bandwidth parts determined by the wireless communications device.

14. A wireless communications device configured to operate in an unlicensed radio frequency band used by a wireless communications network, and further configured to access the unlicensed radio frequency band by being configured to:
receive from a network node comprised in the wireless communications network, downlink control information (DCI) including an explicit indication requesting the wireless communications device to make a prioritization among a plurality of bandwidth parts comprised in the unlicensed radio frequency band;
prioritize, in response to receiving the indication, among the plurality of bandwidth parts according to a selected prioritization algorithm determined by the wireless communications device;
select at least one bandwidth part of the plurality of bandwidth parts in accordance with the prioritization; and
access the at least one bandwidth part selected.

15. The wireless communications device according to claim 14, wherein the wireless communications device is configured to access the unlicensed radio frequency band by performing channel sensing and/or transmitting data and/or receiving data on at least one of the plurality of bandwidth parts.

16. The wireless communications device according to claim 14, wherein the wireless communications device is configured to prioritize among the plurality of bandwidth parts based on any one or more of:
a result of channel sensing and/or transmission performance and/or reception performance among the plurality of bandwidth parts;
a measure of channel occupancy among the plurality of bandwidth parts; and
a hopping sequence among the plurality of bandwidth parts.

17. The wireless communications device according to claim 14, wherein the wireless communications device is configured to prioritize among the plurality of bandwidth parts based on a parameter associated with the plurality of bandwidth parts determined by the wireless communications device.

18. A method, performed by a network node configured to operate in an unlicensed radio frequency band used by a wireless communications network, for controlling access to the unlicensed radio frequency band, the method comprising:
transmitting, to a wireless communications device configured to operate in the wireless communications network, downlink control information (DCI) including an explicit request for the wireless communications device to make a prioritization among a plurality of bandwidth parts comprised in the unlicensed radio frequency band without further prioritization information,
wherein the network node configures the wireless communications device to prioritize, in response to receiving the request, among the plurality of bandwidth parts, select at least one bandwidth part among the plurality of bandwidth parts in accordance with the prioritization, and to access the at least one bandwidth part selected.

19. The method according claim 18, wherein controlling the access to the unlicensed radio frequency band further comprises
transmitting to the wireless communications device a second indication indicating that the prioritization among the plurality of bandwidth parts is to be based on any one or more of:
a result of channel sensing and/or transmission performance and/or reception performance among the plurality of bandwidth parts;
a measure of channel occupancy among the plurality of bandwidth parts; and
a hopping sequence among the plurality of bandwidth parts.

* * * * *